United States Patent [19]

Dukelow

[11] 4,244,216

[45] Jan. 13, 1981

[54] HEAT FLOW METER

[75] Inventor: Samuel G. Dukelow, Mayfield Village, Ohio

[73] Assignee: The Babcock & Wilcox Company, New Orleans, La.

[21] Appl. No.: 1,557

[22] Filed: Jan. 8, 1979

[51] Int. Cl.$^3$ .................... G01K 17/06; G01K 17/10
[52] U.S. Cl. ............................ 73/190 H; 73/193 R; 364/550
[58] Field of Search ............ 73/190 H, 193 R, 190 R, 73/344, 345; 364/557, 558, 718, 550

[56] References Cited
FOREIGN PATENT DOCUMENTS 663083  7/1948  United Kingdom ................. 73/193 R

OTHER PUBLICATIONS

Brochure Form #Q500-1, Bailey Meter Company, Sep. 1962.
Physics by Hausmann et al, copyright 1939, p. 214.

Primary Examiner—Gerald Goldberg
Assistant Examiner—Denis E. Corr
Attorney, Agent, or Firm—Robert J. Edwards; Vytas R. Matas; John F. Luhrs

[57] ABSTRACT

A meter of the heat transported by a heat carrier comprising a meter of the rate of flow of the carrier at specified design conditions of pressure, temperature or quality, and enthalpy compensated by a compound correction factor consisting of the product of a composite pressure correction factor and a composite temperature or quality correction factor for deviations of the carrier from design conditions.

7 Claims, 1 Drawing Figure

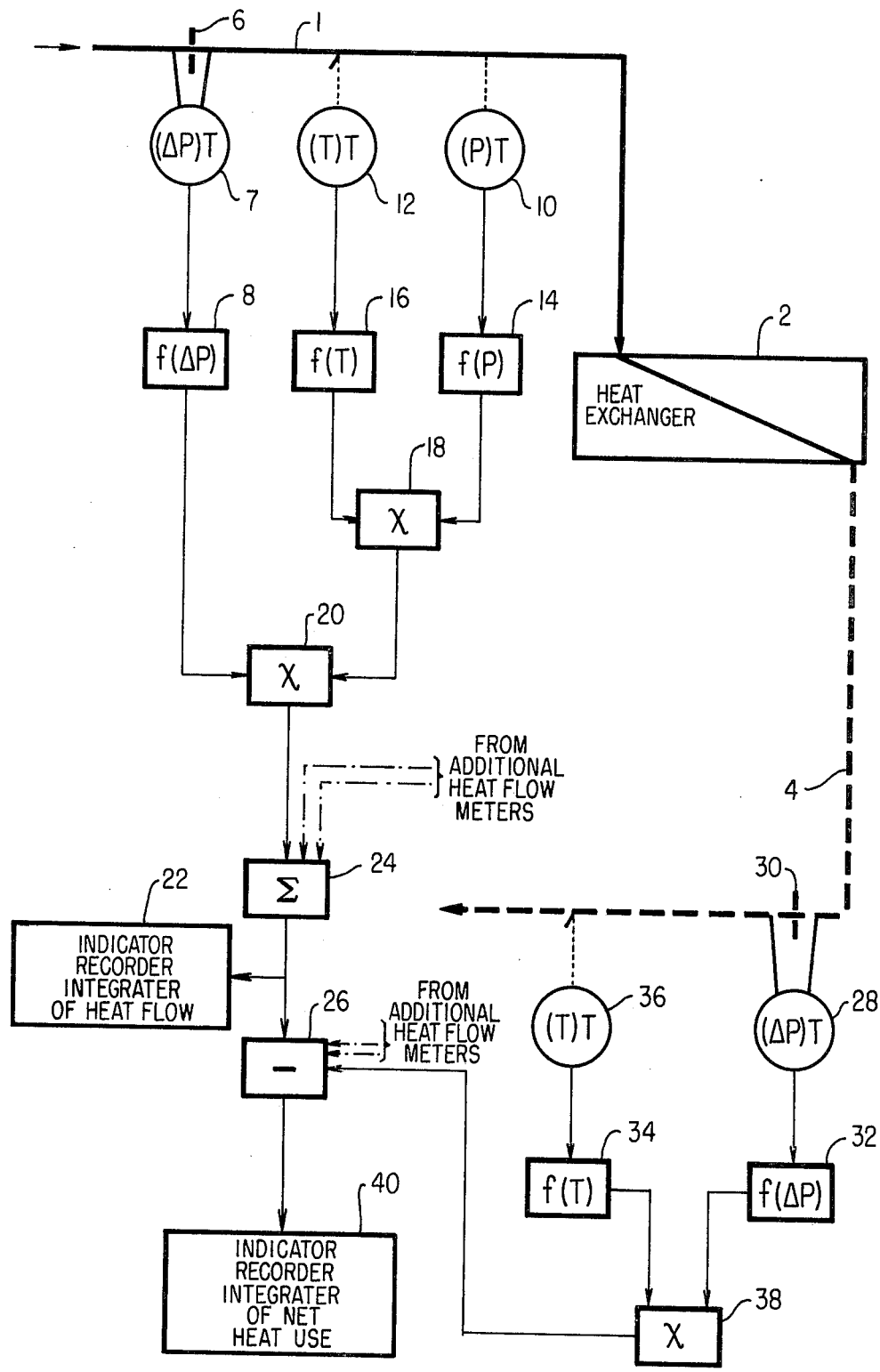

HEAT FLOW METER

This invention relates to a heat flow meter and more particularly to a meter of the heat carried in a flowing vapor such as steam, mercury vapor, ammonia vapor, Dowtherm or the like, and which may be utilized in a heat engine such as a turbine, or in a heat exchanger.

Ordinarily, a conduit is used to transport the heat carrier from a source, such as a vapor generator, to the heat exchanger or other type of heat user. In the past it has been customary to take the rate weight, or mass, as it is sometimes called, flow of the heat carrier as a measure of the rate of heat flow. Typical of the means for measuring the weight rate of flow of the heat carrier is a meter wherein a primary element, such as an orifice, flow nozzle, or venturi tube is placed in the conduit and the rate of flow inferentially determined from the differential pressure produced. Such a meter is designed for one set of vapor conditions and a predetermined max. pressure differential, ordinarily designated as the design conditions. The weight rate of flow is given by the equation:

$$W_D = K \left( \frac{\Delta P}{V_D} \right)^{\frac{1}{2}} \quad (1)$$

Where:
$W_D$ = weight rate of flow at design conditions
$K$ = a constant
$\Delta P$ = differential pressure
$V_D$ = specific volume at design conditions At design conditions the carrier has a discrete enthalpy and the rate of heat flow can be determined by multiplying the weight rate of flow by the enthalpy.

When flowing conditions of the heat carrier differ from design conditions, it is necessary to apply a correction factor to the meter reading to obtain the true weight rate of flow as determined by the equation:

$$CF_V = \left( \frac{V_D}{V_F} \right)^{\frac{1}{2}} \quad (2)$$

Where:
$CF_V$ = correction factor for specific volume changes
$V_F$ = specific volume at flowing conditions Similarly, it is necessary to apply a correction factor to the meter reading for changes in enthalpy as determined by the equation:

$$CF_h = \frac{h_F}{h_D} \quad (3)$$

Where:
$CF_h$ = correction factor for enthalpy
$h_F$ = enthalpy at flowing conditions
$h_D$ = enthalpy at design conditions Tables are available, such as the well known Keenan and Keyes, "Thermodynamic Properties of Steam", from which the specific volume and enthalpy of the heat carrier can be determined knowing the pressure and temperature, in the case of a superheated vapor carrier, or pressure and quality in the case of a saturated vapor carrier.

As it is seldom, if ever, that the flowing conditions of a heat carrier agree with the design conditions, and further, as it is seldom, if ever, that the flowing conditions remain constant, it is necessary, in order to obtain the rate of heat flow, to take readings of the pressure and temperature, or quality, of the heat carrier and apply a correction factor as determined by equations (2) and (3) to the meter reading. Frequently, it is the total heat transported over a selected time period, such as twenty four hours, that is required for accounting or billing purposes. In such cases it is customary to base the correction factor on the average flowing conditions of the heat carrier over the selected time period, usually obtained by taking periodic pressure and temperature, or quality readings.

From the foregoing it is apparent that obtaining the rate of heat flow, or the total heat flow, over a selected period of time, is time consuming and, at best, gives but an approximation of the true rate of heat flow or total heat flow. It is therefore a principle object of this invention to provide a heat flow meter wherein the weight rate of flow of a vapor carrier is automatically and continuously compensated for departure of flowing conditions from design conditions in accordance with the equation:

$$H = K \left( \frac{\Delta P}{V_D} \right)^{\frac{1}{2}} \times \left( \frac{V_D}{V_F} \right)^{\frac{1}{2}} \times h_D \times \frac{h_F}{h_D} \quad (4)$$

Where:
$H$ = rate of heat flow

It is a further object of this invention to provide a heat flow meter which can be constructed of pneumatic, electric or electronic analog or digital components.

It is a further object of this invention to provide a meter of the heat consumption of a heat user such as a turbine or heat exchanger.

It is a further object of this invention to provide a heat flow meter of rugged and simple construction, suitable for use in industrial environments.

These and other objects will be apparent as the description proceeds in connection with the drawing, in which:

IN THE DRAWING

The drawing is a logic diagram of a meter embodying the principles of this invention as applied to the measurement of heat flow in a vapor carrier such as steam.

DETAILED DESCRIPTION

In the drawing and in the following description conventional logic symbols have been used. It will be recognised that the components, or hardware, as it is sometimes called, which such symbols represent, are commercially available and their operation well understood by those familiar with the art. Further, conventional logic symbols have been used to avoid specific identification of this invention with any particular type of components such as analog or digital pneumatic, electric or electronic, as this invention comprehends incorporating any one or a combination of such types.

Illustrated in the drawing is a conduit 1 through which a heat carrier, such as steam, flows, in the direction of the arrow, from a source (not shown) to a heat exchanger 2. The heat carrier in vapor or condensed form, depending upon the exigencies of a particular application, is discharged from the heat exchanger 2 through a conduit 4 and which may or may not be returned to the source.

Disposed within the conduit 1 is a primary element 6, such as an orifice, flow nozzle or venturi tube producing a differential pressure varying in functional relationship to the rate of flow of the heat carrier, designed to produce at specified design conditions a predetermined max. differential at a selected max. rate of flow. It will be recognized that other types of primary elements may be used which generate a signal varying in known functional relationship to the rate of carrier flow.

A signal corresponding to the differential produced by the primary element is generated in a so-called delta-P transmitter 7 which inputs to a function generator 8 generating an output signal corresponding to the weight or mass rate of carrier flow at design conditions.

As known, no practical means are presently available for determining, by in-situ measurement, the specific volume or enthalpy of a flowing vapor. Accordingly, the specific volume correction factor set forth in equation (2) and the enthalpy correction factor set forth in equation (3) is determined by means of tables, such as the aforementioned Keenan and Keyes tables, or available equations, giving the relationship between pressure, temperature or quality and specific volume and enthalpy for a specific heat carrier. From such tables or equations the specific volume and enthalpy vs pressure of the carrier along an isothermal line passing through the value of specific volume at design conditions can be determined by means of the equation:

$$CF_p = \left[\frac{f_1(P)}{V_D}\right]^{\frac{1}{2}} \times \frac{f_2(P)}{h_D} \quad (5)$$

Where:
$CF_P$=composite pressure correction factor
$f_1(P)$=specific volume at flowing press. and design temp.
$f_2(P)$=enthalpy at flowing press. and design temp.

Similarly, the specific volume and enthalpy vs temperature of the carrier along an isopiestic line passing through the value of specific volume at design conditions can be determined. From the value so determined a composite temperature correction factor can be derived from the equation:

$$CF_T = \left[\frac{f_1(T)}{V_D}\right]^{\frac{1}{2}} \times \frac{f_2(T)}{h_D} \quad (6)$$

Where:
$CF_T$=composite temperature correction factor
$f_1(T)$=specific volume at flowing temp. and design press.
$f_2(T)$=enthalpy at flowing temp. and design press.

As illustrated, there is shown a function generator 14 accepting the output signal from a pressure transmitter 10 generating an output signal corresponding to $CF_P$ of equation (5). Likewise, there is shown a function generator 16 accepting the output signal from a temperature transmitter 12 generating an output signal corresponding to $CF_T$ of equation (6).

By means of a multiplier unit 18, receiving the output signals of function generators 14 and 16 an output signal is generated corresponding to a compound correction factor equal to:

$$CF_C = CF_T \times CF_P \quad (7)$$

In multiplier unit 20, receiving the output signals from multiplier 18 and function generator 8 an output signal is generated corresponding to the rate of heat flow through the conduit 1, which is transmitted to suitable readout devices such as shown at 22.

The total heat flow to a plurality of heat users, such as the heat exchanger 2, can be ascertained by means of a summing unit 24. A readout device such as shown at 22 may be incorporated in each heat flow meter if desired.

Frequently it is desired to determine the net heat consumed in a heat user. If the heat carrier is discharged in the form of a vapor, a heat flow meter such as previously described may be used to measure the heat flow through the return conduit 4 and subtracted from the heat flow to the heat exchanger 2 by means of a difference unit 26. However, if the heat carrier is discharged as condensate, i.e. in liquid form, in which the enthalpy and specific volume is a function of temperature, the heat flow can be determined by means of a Delta-P transmitter 28 generating an output signal corresponding to the differential pressure produced by a primary element 30 installed in the return line 4. A function generator 32 responsive to the signal generated by the transmitter 28 produces an output signal corresponding to the rate of flow of the heat carrier through the conduit 4 at design conditions.

A composite output signal is produced in function generator 34, responsive to the signal generated in temperature transmitter 36, corresponding to the correction required to the output signal of function generator 32 to generate, by means of multiplier unit 38, a signal corresponding to the heat flow through the conduit 4. The output signal from multiplier unit 38 is subtracted from the output signal from multiplier unit 20, or summing unit 24, as the case may be, in difference unit 26 to generate an output signal corresponding to the heat transferred in heat exchanger 2. The signal output of difference unit 26 can operate a readout device, such as shown at 40, to exhibit the net heat use by one or a plurality of heat users.

A specific embodiment of this invention has been illustrated and described by way of example only. It is apparent that various modifications can be made within the scope of the invention as defined in the appended claims.

The embodiments of the invention in which an exclusive property or privilege is claimed are defined as follows:

1. A meter of the heat transported through a conduit by a vapor carrier having a specific volume and enthalpy each of which varies in known discrete functional relationship with the carrier conditions of pressure and temperature, comprising, means generating a first signal proportional to the heat transported by the carrier at the specific volume and enthalpy as determined from predetermined values of said conditions of the carrier; and means correcting first said signal for the change in specific volume and enthalpy of the carrier produced by a change in value of one of said conditions from the predetermined value comprising, means generating a signal proportional to the value of said one condition, a first function generator responsive to said last named signal generating a first composite signal proportional to the total correction required to said first signal for the change in specific volume and enthalpy of the carrier produced by the change in value of said one condition from the predetermined value and means modifying said first signal by said first composite signal correcting said first signal for the error produced by the change in said one condition from said predetermined value.

2. A meter as set forth in claim 1 wherein said one condition is the temperature of the carrier and the first composite signal produced by said first function generator varies in functional relationship to the total correction required for the change in specific volume and enthalpy of the carrier produced by the change in temperature of the carrier from said predetermined value.

3. A meter as set forth in claim 1 wherein said one condition is the pressure of the carrier and the first composite signal produced by said first function generator varies in functional relationship to the total correction required for the change in specific volume and enthalpy of the carrier produced by the change in pressure of the carrier from said predetermined value.

4. A meter as set forth in claim 1 wherein said first function generator produces a first composite signal varying in functional relationship with the product of the separate corrections required to said first signal for the change in specific volume and enthalpy of the carrier produced by the change in value of said one condition from the predetermined value.

5. A meter as set forth in claim 4 wherein said first function generator produces a first composite signal proportional to the square root of the ratio between the specific volumes of the carrier at said change in value and said predetermined value of said one condition multiplied by the ratio of the enthalpies of the carrier at said change in value and said predetermined value of said one condition.

6. A meter as set forth in claim 1 further including means generating a signal proportional to the value of the other of said conditions, a second function generator responsive to said last named signal generating a second composite signal proportional to the total correction required to said first signal for the change in specific volume and enthalpy of the carrier produced by the change in value of the other of said conditions from the predetermined value and means modifying said first signal by the product of said first and second composite signals correcting said first signal for the error produced by changes in said conditions from their respective predetermined values.

7. A meter as set forth in claim 6 further including a second meter as set forth in claim 6 of the heat transported through a second conduit by a second vapor carrier and means algebraically adding the modified signals of said meters generating an output signal proportional to the total of said modified signals.

* * * * *